United States Patent [19]
Heinrichs et al.

[11] Patent Number: 5,570,622
[45] Date of Patent: Nov. 5, 1996

[54] POWER BOOSTER WITH GUIDED POWER PISTON

[75] Inventors: Jeffrey A. Heinrichs; Craig A. Osterday, both of Dayton; Timothy A. Haerr, Enon; Neal B. Rosenblum; Joseph S. Kramer, both of Kettering, all of Ohio

[73] Assignee: General Motors Corporation, Detroit, Mich.

[21] Appl. No.: 486,439

[22] Filed: Jun. 8, 1995

[51] Int. Cl.$^6$ .................................................. F15B 9/10
[52] U.S. Cl. ........................... 91/376 R; 91/533; 92/48; 92/165 R
[58] Field of Search ..................... 92/48, 165 R, 92/165 PR, 168; 91/533, 369.2, 376 R; 60/547.1

[56] References Cited

U.S. PATENT DOCUMENTS

| | | | |
|---|---|---|---|
| 4,256,016 | 3/1981 | Thomas | 91/369 A |
| 4,270,353 | 6/1981 | Thomas et al. | 60/547 R |
| 4,270,438 | 6/1981 | Thomas et al. | 91/49 |
| 4,271,750 | 6/1981 | Thomas et al. | 92/98 D |
| 4,325,218 | 4/1982 | Weiler et al. | 60/547 R |
| 4,338,854 | 7/1982 | Margetts | 91/369 A |
| 4,339,921 | 7/1982 | Schanz | 60/547 R |
| 4,377,966 | 3/1983 | Parker et al. | 92/48 |
| 4,416,191 | 11/1983 | Takeuchi et al. | 92/165 PR |
| 4,418,613 | 12/1983 | Weiler et al. | 92/98 D |
| 4,433,614 | 2/1984 | Takeuchi et al. | 91/376 R |
| 4,499,812 | 2/1985 | Pressaco et al. | 91/376 R |
| 4,522,108 | 6/1985 | Takeuchi et al. | 91/376 R |
| 4,526,089 | 7/1985 | Takeuchi | 92/98 D |
| 4,542,680 | 9/1985 | Takeuchi | 91/369 A |
| 4,557,179 | 12/1985 | Takeuchi et al. | 91/369 A |
| 4,594,854 | 6/1986 | Takeuchi et al. | 60/547.1 |
| 4,617,858 | 10/1986 | Hachiro | 92/98 D |
| 4,783,964 | 11/1988 | Fanelli et al. | 60/547.1 |
| 4,905,571 | 3/1990 | DeHoff et al. | 91/376 R |
| 4,944,214 | 7/1990 | Briggs | 92/98 R |
| 5,056,413 | 10/1991 | Kaub | 91/369.3 |
| 5,072,996 | 12/1991 | Heibel et al. | 303/114 |

FOREIGN PATENT DOCUMENTS

| | | |
|---|---|---|
| 4236148A1 | 4/1994 | Germany . |
| WO94/00324 | 1/1994 | WIPO . |

*Primary Examiner*—Thomas E. Denion
*Attorney, Agent, or Firm*—Jeffrey A. Sedlar

[57] ABSTRACT

A guide rod extends longitudinally through the power piston of a vacuum power booster providing lateral support thereto and tying the master cylinder housing to a bracket on the rear of the power booster housing. A guide rod provides a means of positively laterally supporting the power piston, control valve and push rods of the power booster thereby providing the ability to reduce the relative supportive strength of the housing, housing divider and piston bearings.

5 Claims, 2 Drawing Sheets

POWER BOOSTER WITH GUIDED POWER PISTON

BACKGROUND OF THE INVENTION

The present invention relates to a power booster for vehicle brake systems. More particularly, the invention relates to a vacuum power booster which uses vacuum and atmospheric pressure to provide power assist to a fluid brake system's master cylinder.

Power boosters operating on vacuum pressure are well known and generally comprise a piston which is axially moveable by differential pressures acting on a diaphragm and support plate which separate the booster housing into a control volume containing vacuum and a control volume containing a variable pressure. A valve mechanism for the power booster is operable to admit atmospheric air pressure into the control volume containing variable pressure to actuate the power booster and move the piston.

It is known to provide a tie rod which extends through a power booster and penetrates the diaphragm and support plate to transmit forces which act upon the booster housing. This type of an arrangement requires a complex sealing structure between the tie rod and the diaphragm and does not provide direct support to the power piston itself. It is also known to provide an axial force transmission unit which extends through the valve mechanism. This type of an arrangement is not amenable to the use of a conventional valve mechanism with the booster which instead must be replaced by a new and complex valve design.

SUMMARY OF THE INVENTION

It is an aspect of the present invention to provide a power booster of the vacuum-operated type which integrates structural support in a manner that requires minimal changes to conventional power booster component designs and which avoids the need to utilize complex seals or valve mechanisms.

A power booster according to an aspect of the present invention includes a diaphragm separating the power booster housing into at least two control volumes and which need be penetrated only by a one-piece power piston. The power piston includes a bore that carries a conventional control valve assembly and includes at least one longitudinal bore outside the control valve bore that slidably receives a guide rod which extends through the power booster housing. The guide rod provides support directly to both the power booster housing and the power piston. A relatively simple conventional seal is utilized between the guide rod and the longitudinal bore.

A power booster according to another aspect of the present invention includes an annular bracket on the rear of the housing that mates with and guidingly receives the power piston. This provides additional lateral support to the power piston while allowing free axial sliding movement.

DETAILED DESCRIPTION OF THE PRESENTLY PREFERRED EMBODIMENT

Figure 1:
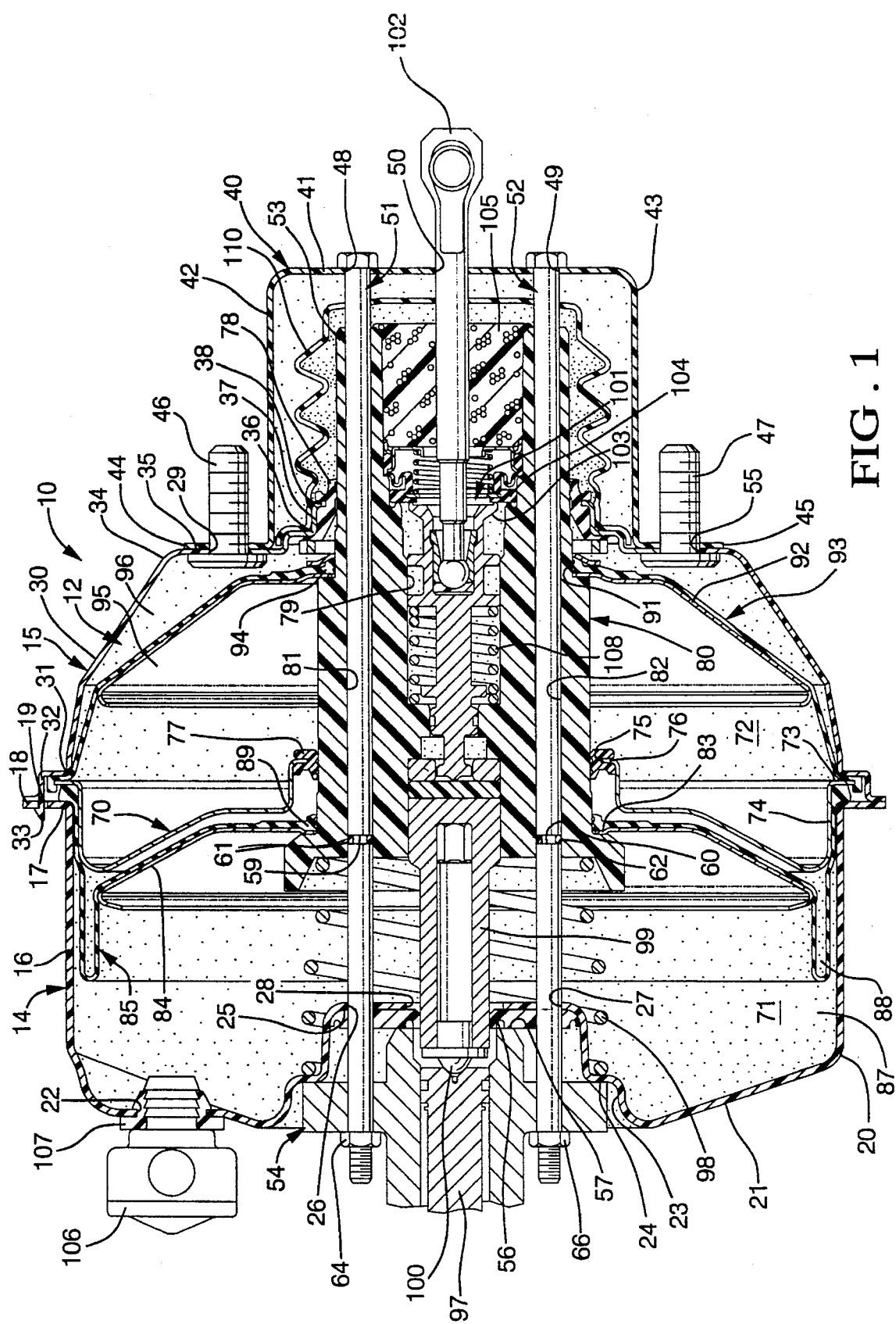
FIG. 1 is a cross-sectional view of a tandem diaphragm power booster.

Referring to FIG. 1, illustrated is a power booster 10 of the tandem diaphragm type. The power booster 10 has a substantially open internal cavity 12 which is formed by mating front housing 14 and rear housing 15. The front and rear housings 14, 15 are formed from a conventional material such as metal or plastic.

The front housing 14 includes an axially extending wall 16 which at its rearward end 17 extends into an outer turned flange 18. The outer turned flange 18 includes a series of openings, representative of which is opening 19, formed therein. The front housing 14 includes a forward end 20 which turns inwardly and forms forward wall 21. Forward wall 21 includes opening 22 and recessed section 23 which includes master cylinder seat 24, seal seat 25, openings 26 and 27 and inward terminal edge 28 which forms an axial opening.

Rear housing 15 includes outer wall 30 which at its forward end 31 integrally extends into axially extending flange 32. Axially extending flange 32 mates with outer turned flange 18 of front housing 14 and includes a plurality of hooked tabs, representative of which is hooked tab 33, that clips within opening 19, obviating the need to otherwise secure the housing sections together. The outer wall 30, at its rearward end 34, integrally extends into rear wall 35 which includes openings 29 and 55. The inner edge 36 of rear wall 35 extends into axially extending flange 37 which includes inner turned terminal end 38.

A bracket 40 includes rearward wall 41 and integral axially extending walls 42 and 43 and substantially encloses the area rearward of rear housing 15 around the terminal end 38. Optionally, the bracket is annular in shape and therefore, axially extending walls 42 and 43 comprise one annular wall. Axially extending wall 42 includes outwardly extending flange 44 which is attached to rear housing 15 by a fastener 46 that extends through opening 29. Axially extending wall 43 includes outwardly extending flange 45 which is attached to rear housing 15 by fastener 47 that extends through opening 39. Rearward wall 41 of bracket 40 includes openings 48, 49 and 50. The bracket 40 provides a substantially enclosed, protected environment to the axial area rearward of rear housing 15.

A pair of guide rods 51 and 52 extend longitudinally through the power booster 10 exiting rearward through openings 48 and 49 respectively, of bracket 40 and exiting forwardly through openings 26 and 27 respectively, of front housing 14. The guide rods 51 and 52 engage a master cylinder housing 54, drawing it against master cylinder seat 24 of forward wall 21. The guide rods 51 and 52 include grooves 59 and 60 which carry O-ring seals 61 and 62 respectively, and threadedly receive nuts 64 and 66.

A seal 56 seals the area within recessed section 23 including opening 26, opening 27 and the opening through inward terminal edge 28. The seal is secured between the rearward terminal edge 57 of master cylinder housing 54 and front housing 14.

A housing divider 70 separates the internal cavity 12 into front and rear chambers 71 and 72 respectively. Housing divider 70 includes an outer peripheral flange 73 which sealingly engages the rear housing 15 and an axially extending flange 74 which sealingly engages front housing 14. Housing divider 70 also includes an inner edge 75 on inwardly directed flange 76 which carries an annular seal 77. A similar annular seal 78 is carried by inner turned terminal end 38 of rear housing 15.

A power piston 80 extends through annular seals 77 and 78 and is slidably received on guide rods 51 and 52 which extend through longitudinal openings 81 and 82 respectively. The power piston 80 is slidable forwardly and rearwardly on guide rods 51 and 52 within the annular seals 77 and 78. In a conventional power booster assembly the annular seals 77 and 78 would be configured as bearings for supporting the power piston 80 in the lateral direction. Because of the guide rods 51 and 52 the power piston 80 is adequately supported laterally and is guided in the axial direction such that the annular seals 77 and 78 need only provide pressure separation between front and rear chambers 71 and 72 in the case of housing divider 70 and between rear chamber 72 and the atmosphere in the case of rear housing 15.

Power piston 80 includes a rearwardly directed wall 83 upon which support plate 84 supports diaphragm 85. Diaphragm 85 includes an outer seal, sealingly engaging housing divider 70 and front housing 14 and separates front chamber 71 into control volume 87 and control volume 88. Diaphragm 85 includes an integral inner annular seal 89 which engages the power piston 80.

Power piston 80 also includes rearwardly directed wall 91 upon which support plate 92 supports diaphragm 93. Diaphragm 93 sealingly engages housing divider 70 and rear housing 15 and includes an integral inner annular seal 94 which engages power piston 80. Diaphragm 93 separates rear chamber 72 into control volume 95 and control volume 96.

The diaphragms 85 and 93 and their respective support plates 84 and 92 are operable such that a vacuum pressure exists in control volumes 87 and 95 and a variable pressure exists in control volumes 88 and 96 for selectively moving power piston 80 forward in response to pressure differentials created by the introduction of atmospheric air. A variable pressure in control volumes 88 and 96 selectively creates a force on the respective diaphragms 85 and 93. The support plates 84 and 92 apply the force on the diaphragms to the respective rearwardly directing walls 83 and 91 of power piston 80. In response, power piston 80 compresses return spring 98 causing power piston 80 to slide along the guide rods 51 and 52 forcing reaction retainer 99 and tip 100 to apply force to the master cylinder piston 97.

The variable pressure in control volumes 88 and 96 is increased through the operation of control valve 101 by push rod 102 which moves air valve 103 to separate from valve seat 104. Separation allows atmospheric pressure to enter the control volumes 88 and 96 and thus creates a pressure differential across the diaphragms 85 and 93. Atmospheric air entering the power booster 10 travels through filter 105 and the vacuum drawn from the power booster 10 exits through vacuum check valve 106 which is received within grommet 107 in opening 22. Power piston 80 includes a plurality of air passages (not illustrated), through which flow is directed in a conventional manner.

After application, when the push rod 102 is released spring 108 forces control valve 101 to re-engage valve seat 104 interrupting the flow of atmospheric air into power booster 10 and vacuum flow out through vacuum check valve 106 re-equalizes pressure on opposing sides of diaphragms 85 and 93. Again, flow passages (not illustrated), are conventionally provided through power piston 80. As the pressure differential is reduced, return spring 98 forces power piston 80 to slide rearwardly on guide rods 51 and 52 and return to an at-rest position. The rearward end 53 of power piston 80 extends out from rear housing 15 and is enclosed within boot 110 and the protective environment of bracket 40.

By providing the guide rods 51 and 52 the power piston 80 is laterally supported through its axial travel during operation of the power booster 10. A simplified sealing means comprised of O-rings 61 and 62 provides a seal between the guide rods 51 and 52 and the power piston 80. A conventional control valve assembly 101 is provided in the bore 79 of power piston 80. The guide rods 51 and 52 also provide the ability to reduce the relative strength of front housing 14 and rear housing 15 and may reduce the need of housing divider 70 and the annular seals 77 and 78 to laterally guide the power piston 80. In cooperation with the guide rods 51 and 52 the snapping engagement of the housings 14 and 15 through the hooked tab and opening arrangement obviates conventional methods of securing the housings together such as staking.

Figure 2:
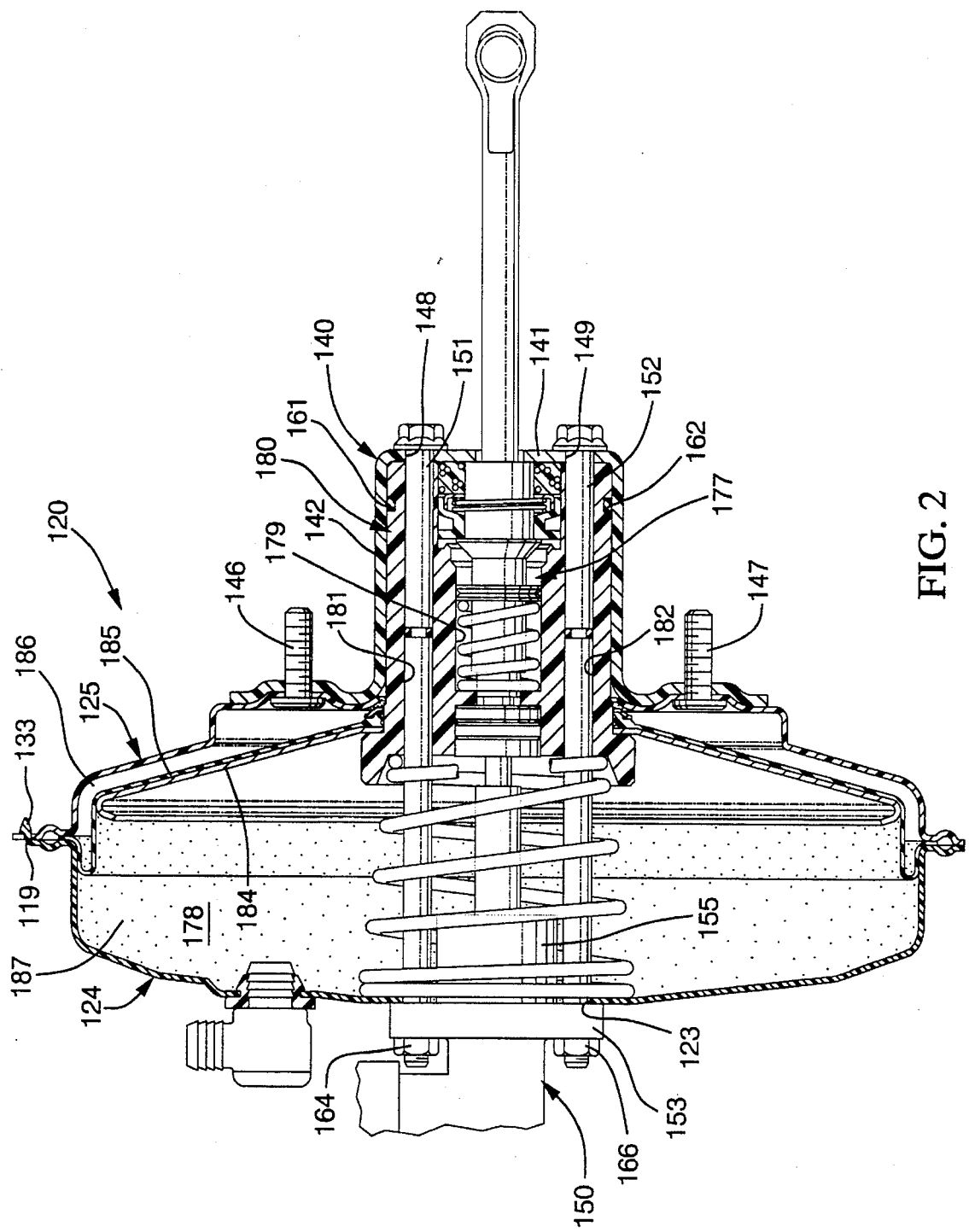
FIG. 2 is a cross-sectional view of a single diaphragm booster.

Referring to FIG. 2, a single diaphragm power booster 120 is illustrated. In a manner similar to the power booster 10 of FIG. 1, power booster 120 includes mating front housing 124 and rear housing 125 components. The housings 124 and 125 are connected together by a plurality of clip-type structures representative of which is hooked tab 133 which clips within opening 119.

A support plate 184 and diaphragm 185 which sealingly engages the housings 124 and 125 and the power piston 180, separates the internal chamber 178 into control volumes 187 and 186.

A bracket 140 includes a rearward wall 141 and integral axially extending walls 142 and 143. The bracket is attached to the housing 125 by fasteners 146 and 147 which additionally serve to mount the power booster 120 to supporting structure (not illustrated). The bracket 140 closely mates with and slidably receives the power piston 180 and therefore, provides lateral support thereto. Power piston 180 includes groove 161 that carries O-ring seal 162. O-ring seal 162 engages power piston 180 and bracket 140 providing a seal therebetween.

The power piston 180 includes an axial bore 179 that carries control valve assembly 177. The power piston 180 is slidably guided and supported by guide rods 151 and 152 which extend through the power booster 120 penetrating openings 148 and 149 of bracket 140, openings 181 and 182 of power piston 180 and opening 128 of front housing 124. The guide rods 151 and 152 extend through mounting flange 151 of master cylinder 150. Nuts 164 and 166 engage guide rods 151 and 152 securing the master cylinder 150 to the power booster 120. The master cylinder 150 includes an extension 155 that extends through opening 128 and into the power booster 120 between guide rods 151 and 152. This provides the advantage of shortening the overall length of the power booster 120 and master cylinder 150 assembly.

What is claimed is:

1. A power booster and master cylinder assembly comprising:

a housing having an internal cavity and an opening through the housing to the internal cavity;

a diaphragm having an outer periphery sealingly engaging the housing and having an inner annular seal, the diaphragm separating the internal cavity into at least two control volumes;

a one piece power piston extending through and engaging the inner annular seal and including an axial bore carrying a control valve within the power piston;

a first guide rod extending through the power piston outside the axial bore;

a second guide rod extending through the power piston outside the axial bore; and wherein the master cylinder is attached to the power booster by the first and second guide rods with an extension of the master cylinder extending through the opening of the housing into the internal chamber between the guide rods.

2. A power booster according to claim 1 further comprising a bracket attached to the housing wherein the power piston is slidably received within the bracket and guided by the bracket.

3. A power booster according to claim 1 wherein the housing includes a front housing section and a rear housing section and wherein the front housing section includes a first clip structure and the rear housing section includes a second clip structure and wherein the front and rear housing sections are engaged together by the first and the second clip structures.

4. A power booster according to claim 1 wherein the housing includes a front housing section and a rear housing section and wherein the first and the second guide rods each extend through both the front and the rear housing sections.

5. A power booster according to claim 2 wherein the power piston includes a groove and further comprising a seal carried in the groove and being sealing engaged between the power piston and the bracket.

* * * * *